United States Patent
Kagata et al.

(10) Patent No.: US 9,308,761 B2
(45) Date of Patent: Apr. 12, 2016

(54) INK JET PRINTING METHOD, INK SET, AND PRINTED MATTER

(75) Inventors: Takayoshi Kagata, Shiojiri (JP); Tsuyoshi Sano, Shiojiri (JP); Hidehiko Komatsu, Chino (JP); Naoki Koike, Matsumoto (JP)

(73) Assignee: Seiko Epson Corporation (JP)

( * ) Notice: Subject to any disclaimer, the term of this patent is extended or adjusted under 35 U.S.C. 154(b) by 285 days.

(21) Appl. No.: 13/182,649

(22) Filed: Jul. 14, 2011

(65) Prior Publication Data

US 2012/0038702 A1 Feb. 16, 2012

(30) Foreign Application Priority Data

Aug. 11, 2010 (JP) ................................. 2010-180104
Aug. 11, 2010 (JP) ................................. 2010-180105

(51) Int. Cl.
| | |
|---|---|
| *B41J 2/015* | (2006.01) |
| *C09D 11/10* | (2014.01) |
| *B41M 5/00* | (2006.01) |
| *C09D 11/322* | (2014.01) |
| *C09D 11/54* | (2014.01) |

(52) U.S. Cl.
CPC ........... *B41M 5/0011* (2013.01); *B41M 5/0017* (2013.01); *B41M 5/0023* (2013.01); *B41M 5/0047* (2013.01); *B41M 5/0064* (2013.01); *C09D 11/322* (2013.01); *C09D 11/54* (2013.01)

(58) Field of Classification Search
CPC ........ B41J 2202/02; B41J 2/14; B41J 2/1623; B41J 2/1631; B41J 2/2114; B41M 5/0017; B41M 5/52; B41M 5/5218; C09D 11/40; C09D 11/30

USPC .................. 347/21, 20, 98, 100, 107, 105
See application file for complete search history.

(56) References Cited

U.S. PATENT DOCUMENTS

| | | | | |
|---|---|---|---|---|
| 4,385,149 | A * | 5/1983 | Tsuchiya et al. | ............... 524/313 |
| 4,552,923 | A * | 11/1985 | Tsuchiya et al. | ................ 525/68 |
| 5,248,335 | A * | 9/1993 | Ohtomo | ........................ 106/402 |
| 5,397,619 | A * | 3/1995 | Kuroyama et al. | ........ 428/32.33 |
| 5,756,188 | A * | 5/1998 | Reiter et al. | ............... 428/195.1 |
| 6,544,323 | B2* | 4/2003 | An | ............................ 106/31.68 |

(Continued)

FOREIGN PATENT DOCUMENTS

| | | |
|---|---|---|
| EP | 736389 A2 * | 10/1996 |
| JP | 04-010973 B2 | 1/1992 |

(Continued)

OTHER PUBLICATIONS

English Abstract of Japan 2008-174712A.

(Continued)

*Primary Examiner* — Thinh Nguyen
(74) *Attorney, Agent, or Firm* — Harness, Dickey & Pierce, P.L.C.

(57) ABSTRACT

Provided is an ink jet printing method of discharging glitter ink, of which glitter pigment is dispersed in water, onto a non-ink-absorption or low-ink-absorption printing medium in an ink jet method. The ink jet printing method includes: a foundation layer formation process of forming a foundation layer by providing resin ink, of which a resin component is dispersed or dissolved in a dispersion medium, onto at least a portion of the printing medium on which the glitter ink is intended to be discharged; and a glitter ink printing process of discharging the glitter ink onto the foundation layer.

5 Claims, 2 Drawing Sheets

(56) References Cited

U.S. PATENT DOCUMENTS

| | | | |
|---|---|---|---|
| 6,680,108 B1* | 1/2004 | Majumdar et al. | 428/323 |
| 6,730,717 B2* | 5/2004 | Yoshimura et al. | 523/161 |
| 6,866,938 B2* | 3/2005 | Mori et al. | 428/500 |
| 7,173,077 B2* | 2/2007 | Yoshimura et al. | 523/161 |
| 7,891,799 B2 | 2/2011 | Edwards et al. | |
| 7,981,210 B2* | 7/2011 | Kwan et al. | 106/31.86 |
| 8,192,010 B2 | 6/2012 | Edwards et al. | |
| 8,313,572 B2 | 11/2012 | Oyanagi et al. | |
| 8,317,311 B2 | 11/2012 | Edwards et al. | |
| 8,425,031 B2* | 4/2013 | Ohshima et al. | 347/105 |
| 8,430,498 B2 | 4/2013 | Edwards et al. | |
| 8,740,367 B2 | 6/2014 | Edwards et al. | |
| 2001/0009174 A1* | 7/2001 | Dinkel et al. | 156/238 |
| 2002/0007768 A1* | 1/2002 | Yoshimura et al. | 106/400 |
| 2002/0058144 A1* | 5/2002 | Mori et al. | 428/412 |
| 2002/0182376 A1* | 12/2002 | Mukherjee et al. | 428/195 |
| 2003/0030706 A1* | 2/2003 | Jagannathan et al. | 347/85 |
| 2003/0076372 A1* | 4/2003 | Asakawa | 347/5 |
| 2003/0113514 A1* | 6/2003 | Saito et al. | 428/195 |
| 2003/0124273 A1* | 7/2003 | Jung et al. | 428/32.1 |
| 2003/0125414 A1* | 7/2003 | Nakajima et al. | 523/160 |
| 2003/0160850 A1* | 8/2003 | Ohya et al. | 347/101 |
| 2003/0198759 A1* | 10/2003 | Fruge et al. | 428/32.1 |
| 2004/0017454 A1* | 1/2004 | Yoshizawa et al. | 347/102 |
| 2004/0152819 A1* | 8/2004 | Cuch | 524/430 |
| 2004/0178139 A1* | 9/2004 | Suh et al. | 210/488 |
| 2004/0196351 A1* | 10/2004 | Kida et al. | 347/105 |
| 2005/0159505 A1* | 7/2005 | Yoshimura et al. | 523/160 |
| 2007/0026197 A1* | 2/2007 | Suga et al. | 428/172 |
| 2007/0036984 A1 | 2/2007 | Hama et al. | |
| 2007/0076069 A1* | 4/2007 | Edwards et al. | 347/100 |
| 2007/0146454 A1* | 6/2007 | Doi et al. | 347/100 |
| 2007/0202278 A1* | 8/2007 | Schultz et al. | 428/32.24 |
| 2008/0041269 A1* | 2/2008 | Bogale et al. | 106/31.27 |
| 2008/0152825 A1 | 6/2008 | Mukai et al. | |
| 2008/0182083 A1* | 7/2008 | Oyanagi et al. | 428/195.1 |
| 2008/0250970 A1* | 10/2008 | Oyanagi et al. | 106/31.65 |
| 2009/0079783 A1* | 3/2009 | Mehta et al. | 347/21 |
| 2009/0233065 A1 | 9/2009 | Komatsu | |
| 2009/0244168 A1* | 10/2009 | Kakutani | 347/21 |
| 2009/0258203 A1 | 10/2009 | Aoyama et al. | |
| 2010/0079569 A1* | 4/2010 | Kumagai et al. | 347/102 |
| 2010/0187805 A1 | 7/2010 | Sano et al. | |
| 2010/0203091 A1* | 8/2010 | Uang | 424/400 |
| 2011/0025745 A1* | 2/2011 | Izawa et al. | 347/14 |
| 2011/0064917 A1* | 3/2011 | Ritchie | 428/173 |
| 2011/0200797 A1 | 8/2011 | Mukai et al. | |
| 2011/0200799 A1 | 8/2011 | Mukai et al. | |
| 2011/0279611 A1* | 11/2011 | Kagata et al. | 347/100 |
| 2012/0174824 A1* | 7/2012 | Takenaka et al. | 106/404 |
| 2013/0065027 A1* | 3/2013 | Mochizuki et al. | 428/195.1 |
| 2013/0101810 A1 | 4/2013 | Mukai et al. | |
| 2013/0242016 A1 | 9/2013 | Edwards et al. | |
| 2014/0098158 A1 | 4/2014 | Mukai et al. | |

FOREIGN PATENT DOCUMENTS

| | | | |
|---|---|---|---|
| JP | 2000141868 A | * | 5/2000 |
| JP | 2004030716 A | * | 1/2004 |
| JP | 2005-088220 A | | 4/2005 |
| JP | 2006-281570 A | | 10/2006 |
| JP | 2007-023161 A | | 2/2007 |
| JP | 2007-046034 A | | 2/2007 |
| JP | 2008-174712 A | | 7/2008 |
| JP | 2008-213451 | | 9/2008 |
| JP | 2008-221478 A | | 9/2008 |
| JP | 2008-272953 | | 11/2008 |
| JP | 2008-294308 A | | 12/2008 |
| JP | 2009-507692 A | | 2/2009 |
| JP | 2009-107283 A | | 5/2009 |
| JP | 2009-220436 A | | 10/2009 |
| JP | 2009-262549 A | | 11/2009 |
| JP | 2010-052207 A | | 3/2010 |
| WO | WO-2007-033031 A2 | | 3/2007 |

OTHER PUBLICATIONS

English Abstract of Japan 2009-262549A.
European Search Report in Application 11176924.6 Issued May 7, 2012.
Patent Abstract of Japan JP2008-272953 Published Nov. 13, 2008.
Patent Abstract of Japan JP2008-213451 Published Sep. 18, 2008.

* cited by examiner

INK JET PRINTING METHOD, INK SET, AND PRINTED MATTER

Priority is claimed under 35 U.S.C. §119 to Japanese Application No. 2010-180104 filed on Aug. 11, 2010 and No. 2010-180105 filed on Aug. 11, 2010, which are hereby incorporated by reference in its entirety.

BACKGROUND

1. Technical Field

The present invention relates to an ink jet printing method, an ink set, and printed matter.

2. Related Art

Recently, there has been an increase in demand for printed matter of which the printing surfaces have glitter images formed thereon. As a method for forming a glitter image, in the past, for example the following methods have been known: a metal stamping method of performing printing by providing a printing medium of which the printing surface is highly smooth and flat and pressing a metallic foil thereon; a method of vacuum-evaporating a metal or the like on a plastic film of which the printing surface is smooth; and a method of coating a printing medium with glitter pigment ink and performing a press work thereon.

Further, there is a known method of performing printing by discharging ink (hereinafter referred to as glitter ink) which has glitter pigment in an ink jet method (for example, refer to JP-A-2008-174712).

However, in non-absorbent materials or materials of which the absorbability is significantly low such as a metal and a glass, if an ink-receptive layer is not provided, a solvent and the like convect before the ink dries, and thus the surface smoothness of the glitter pigment is lost. Accordingly, problems such as deterioration in glossy arise. Further, in the non-absorbent materials or the printing media of which the absorbability is significantly low, there are problems in that adhesiveness of the glitter pigment to the printing medium is not sufficient and it is difficult to obtain favorable resistance to friction (durability against friction).

Furthermore, in a case of the printing medium of which the surface smoothness is not sufficient like plain paper, even when printing is performed with the glitter pigment in the ink jet method, the glitter pigment is not smoothly dispersed, and thus light is diffusely reflected. Accordingly, it is difficult to obtain a favorable glitter property.

SUMMARY

An advantage of some aspects of the invention is to provide an ink set and an ink jet printing method capable of printing (forming) an image, which has high resistance to friction (durability against friction) while having a high glitter property, even on the non-ink-absorption or low-ink-absorption printing medium, and to provide printed matter on which an image having high resistance to friction while having a high glitter property is printed.

Another advantage of some aspects of the invention is to provide an ink set and an ink jet printing method capable of printing (forming) an image, which has a high glitter property, even on a printing medium of which the smoothness is low, and to provide printed matter on which the image having a high glitter property is printed.

The advantages are achieved by the following aspects of the invention.

According to a first aspect of the invention, there is provided an ink jet recording method of recording aqueous glitter ink, in which glitter pigment is dispersed, onto a non-ink-absorption or low-ink-absorption recording medium or a recording medium of which an arithmetic average roughness Ra is 20 µm or more, in an ink jet method. The ink jet recording method includes: a foundation layer formation process of forming a foundation layer by providing resin ink, in which a resin component is dispersed or dissolved in a dispersion medium, onto at least a portion of the recording medium on which the aqueous glitter ink is intended to be recorded; and a glitter ink recording process of recording the aqueous glitter ink onto the foundation layer. Thereby, it is possible to provide an ink jet printing method capable of printing (forming) an image which has high resistance to friction (durability against friction) while having a high glitter property.

In the ink jet printing method according to the aspect of the invention, it is preferable that the printing medium should be a coated paper or a printing medium which does not have an ink-receptive layer.

Thereby, even on such a printing medium, it is possible to print (form) the image which has high resistance to friction (durability against friction) while having a high glitter property.

In the ink jet printing method according to the aspect of the invention, it is preferable that the foundation layer formation process should include drying the foundation layer.

Thereby, it is possible to form printed matter which has higher resistance to friction.

In the ink jet printing method according to the aspect of the invention, it is preferable that a drying temperature in the drying should be 30° C. or more and 120° C. or less.

Thereby, it is possible to efficiently form the printed matter which has high resistance to friction.

In the ink jet printing method according to the aspect of the invention, it is preferable that a 60-degree glossy of the foundation layer should be 20 or more.

Thereby, it is possible to form an image which has higher resistance to friction while having a high glitter property.

In the ink jet printing method according to the aspect of the invention, it is preferable that the resin component should be at least one selected from groups formed of styrene-acrylic acid copolymer and polyurethane.

Thereby, it is possible to form an image which has higher resistance to friction while having higher glitter property.

It is preferable that an arithmetic average roughness Ra of the foundation layer should be 20 µm or less.

Thereby, it is possible to form an image which has higher resistance to friction while having a high glitter property.

According to a second aspect of the invention, there is provided an ink set including the glitter ink and the resin ink used in the ink jet printing method of the first aspect of the invention.

Thereby, it is possible to provide an ink set capable of printing (forming) an image which has high resistance to friction while having a high glitter property.

According to a third aspect of the invention, there is provided printed matter which is recorded in the ink jet printing method of the first aspect of the invention.

Thereby, it is possible to provide printed matter on which an image having high resistance to friction while having a high glitter property is printed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail.

Ink Jet Apparatus

First, before a description of an ink jet printing method according to an embodiment of the invention, a description will be given of an ink jet apparatus (a liquid droplet discharging apparatus) used in the ink jet printing method according to a preferred embodiment of the invention.

Figure 1:
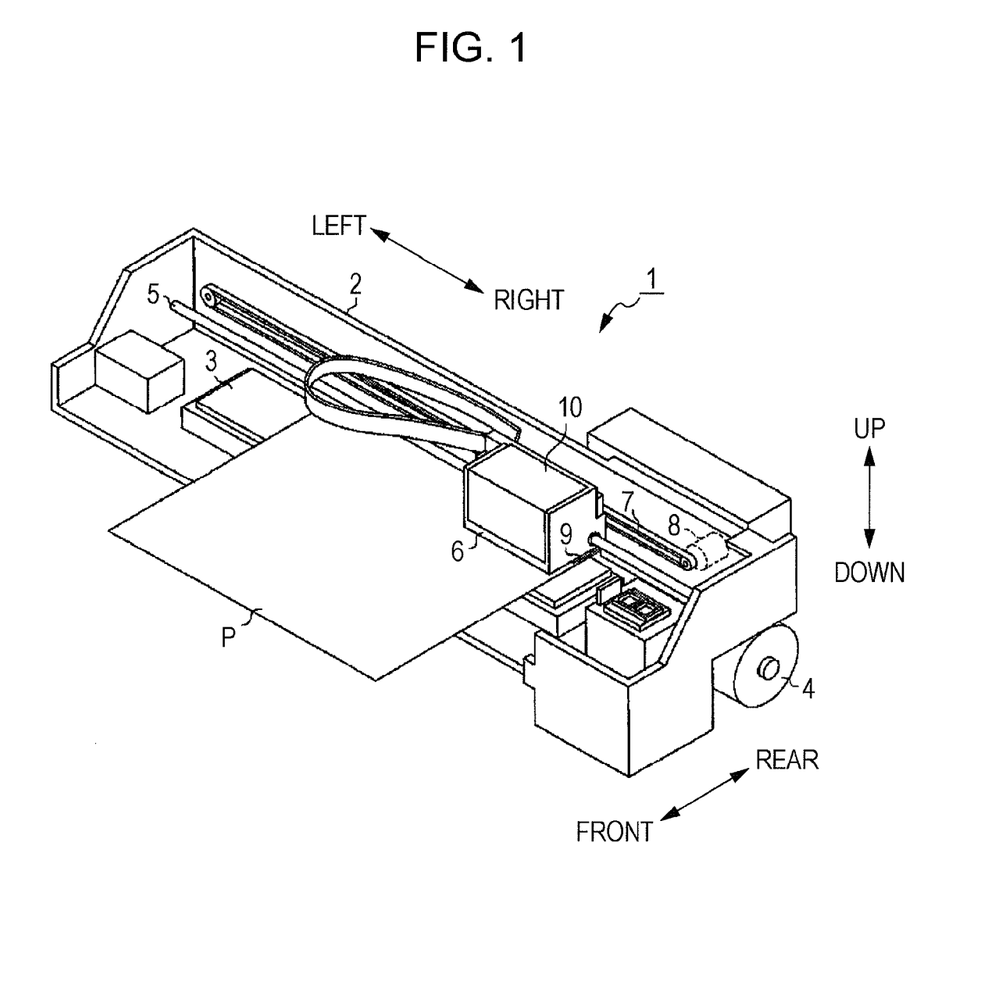
FIG. 1 is a perspective view illustrating a schematic configuration of an ink jet apparatus.

FIG. 1 is a perspective view illustrating a schematic configuration of the ink jet apparatus according to the embodiment of the invention.

As shown in FIG. 1, an ink jet printer 1 (hereinafter referred to as a printer 1) as a printing apparatus has a frame 2. The frame 2 is provided with a platen 3, and paper P is fed onto the platen 3 by driving a printing medium feeding motor 4. Further, in the frame 2, a rod-like guide member 5 is provided to be parallel with the platen 3 in the direction of the longitudinal direction of the platen 3.

A carriage 6 is supported by the guide member 5 so as to be able to reciprocate in the shaft direction of the guide member 5. The carriage 6 is connected to a carriage motor 8 via a timing belt 7 which is provided in the frame 2. The carriage 6 is configured to reciprocate along the guide member 5 by driving the carriage motor 8.

In the carriage 6, a head 9 is provided, and an ink cartridge 10 for supplying ink as liquid to the head 9 is detachably disposed. The ink within the ink cartridge 10 is supplied from the ink cartridge 10 to the head 9 by driving a piezoelectric element, which is not shown, provided in the head 9, and is discharged from a plurality of nozzles, which is formed on the nozzle formation surface of the head 9, onto the printing medium P which is fed onto the platen 3. Thereby, it is possible to form printed matter.

As an ejection method, a thermal jet (bubble jet ("bubble jet" is a registered trade mark)) method may be used. Further, any one of heretofore known methods may be used.

Ink Jet Printing Method

1. Regarding Absorbability

Next, an ink jet printing method according to a preferred embodiment of the invention will be described.

The ink jet printing method according to the embodiment is a method of forming printed matter by discharging glitter ink, of which glitter pigment is dispersed in water, onto the non-ink-absorption or low-ink-absorption printing medium or the printing medium of which the arithmetic average roughness Ra is 20 μm or more, through the above-mentioned ink jet apparatus.

Specifically, the ink jet printing method according to the embodiment includes: a foundation layer formation process of forming a foundation layer, which is constituted by a resin component, by discharging resin ink, of which the resin component is dispersed or dissolved in a dispersion medium, onto the portion of the printing medium, on which the glitter ink is discharged, through the above-mentioned ink jet apparatus; a drying process of drying the formed foundation layer; and a glitter ink printing process of obtaining printed matter by discharging the glitter ink onto the dried foundation layer through the ink jet apparatus.

In addition, in the specification, the "non-ink-absorption or low-ink-absorption printing medium" is defined as a printing medium which has no ink-receptive layer or a printing medium in which the ink-receptive layer is not sufficient. More quantitatively, the non-ink-absorption and low-absorbent printing medium is defined as a printing medium in which the amount of water absorbed in the printing surface during the time from start of the contact to 30 msec$^{1/2}$ is 10 mL/m$^2$ or less in the Bristow method. The Bristow method is a method which is the most widely used method of measuring the amount of liquid absorbed during a short period of time, and is employed by the Japan Technical Association of the Pulp and Paper Industry (JAPAN TAPPI). The detailed test method is described in standard No. 51 "Method of testing liquid absorbability of paper and paper board—Bristow method" in "JAPAN TAPPI journal, pulp test method 2000".

2. Non-Ink-Absorption Printing Medium

Examples of the non-ink-absorption printing medium include: a plastic film which is not subjected to the surface treatment for ink jet printing (that is, does not have the ink-receptive layer); a printing medium which is formed by coating a base such as a paper with plastic; and a printing medium which is formed by adhering a plastic film to the base. Examples of the plastic described herein include polyvinyl chloride, polyethylene terephthalate, polycarbonate, polystyrene, polyurethane, polyethylene, polypropylene, and the like.

3. Low-Ink-Absorption Printing Medium

Examples of the low-ink-absorption printing medium include a coated paper, printing papers such as an light-weight coated paper, an art paper, a coat paper, a mat paper, and a cast paper, and the like.

The coated paper is a paper of which the surface is coated with a coating material so as to increase its sense of beauty and smoothness. The coating material is made by mixing an adhesive such as starch with pigment such as talc, pyrophyllite, clay (kaolin), titanium oxide, magnesium carbonate, or calcium carbonate. The coating material is coated by using a machine called a coater in the process of manufacturing a paper. Examples of the coater include an on-machine type which is directly connected to a paper machine and performs paper making and coating through a single process and an off-machine type which performs coating separately from the paper making. The coated paper is mainly used in printing, and is thus classified as a coated paper for printing in "Statistical classification of production dynamics" of the Japan Ministry of Economy, Trade and Industry.

The light-weight coated paper is a printing paper in which the amount of the coating material coated thereon is 12 g/m$^2$ or less. The art paper is a printing paper which is formed by coating a high-grade printing paper (a high-quality paper, that is, a paper made by using 100% chemical pulp) with a coating material of around 40 g/m$^2$. The coat paper is a printing paper in which the amount of the coating material coated thereon is 20 g/m$^2$ or more and 40 g/m$^2$ or less. The cast paper is a printing paper which is formed to increase glossy and a printing effect by causing a machine called a cast drum to press the surface of the art paper or the coat paper. In addition, in the specification, the amount of coating is a sum of the amounts of coating on both sides of the printing paper.

4. Regarding Surface Roughness

Further, in the embodiment of the invention, it is preferable that the arithmetic average roughness Ra of the surface of the printing medium, onto which the aqueous glitter ink is discharged, should be 20 μm or more. In addition, it is more preferable that the arithmetic average roughness Ra should be 20 μm or more and 100 μm or less.

In addition, the arithmetic average roughness (Ra) can be measured, for example, from the sum of the surface roughnesses or by using an optical interferotype microscope. Specific examples of the apparatus for measuring the surface roughness include a level-difference/surface roughness/minute-shape measurement apparatus P-15 (manufactured by KLA-Tencor Corp.), and the like.

Examples of the printing medium having the rough surface includes, for example, a high-quality paper "55PW8R", XeroxP (manufactured by Fuji Xerox Co., Ltd.; arithmetic average roughness Ra=29.2 μm), a plain/design paper black paper (manufactured by Tochiman Co. Ltd.; arithmetic average roughness Ra=30.2 μm), a superfine paper (manufactured by Seiko Epson Corp.; Ra=36.6 μm), B-flute corrugated board sheet (manufactured by Rengo Corp.; arithmetic average roughness Ra=39.9 μm), and the like.

Hereinafter, the respective processes will be described in detail.

Foundation Layer Formation Process

The foundation layer formation process is a process of providing the resin ink, which will be described later in detail, onto the printing medium and thereby forming the foundation layer.

However, in the ink jet printing method used in the related art, if the non-ink-absorption printing medium or the printing medium of which the absorbability is significantly low is not provided with the ink-receptive layer, a solvent and the like convect before the ink dries, and thus the surface smoothness of the glitter pigment is lost. Accordingly, problems such as deterioration in glossy arise. Further, in the non-ink-absorption printing medium or the printing medium of which the absorbability is significantly low, there are problems in that adhesiveness of the glitter pigment to the printing medium is not sufficient and it is difficult to obtain favorable resistance to friction (durability against friction). Furthermore, in the ink jet printing method used in the related art, in the case of the printing medium of which the surface smoothness is not sufficient like the plain paper, even when printing is performed with the glitter pigment in the ink jet method, the glitter pigment is not smoothly dispersed, and thus light is diffusely reflected. Accordingly, it is difficult to obtain a favorable glitter property.

In contrast, the embodiment of the invention is characterized in that the foundation layer is formed by using the resin ink on the portion, on which at least the glitter ink is provided, on the non-ink-absorption or low-ink-absorption printing medium or the printing medium of which the arithmetic average roughness Ra is 20 μm or more, and the glitter ink is provided on the corresponding foundation layer. With such a configuration, the foundation layer functions as the ink-receptive layer, and the water in the glitter ink permeates into the foundation layer, whereby the glitter pigment can be arranged to be smooth on the surface of the printing medium. As a result, the glitter pigment is arranged to be smooth, and thus it is possible to exhibit high gloss (glitter). Further, by forming the foundation layer, the adhesion of the image, which is formed by the glitter ink, to the printing medium is improved, and thus it is possible to particularly improve the resistance to friction (durability against friction) of the printed matter.

In the embodiment, the resin ink is provided by using the above-mentioned ink jet apparatus. Thereby, it is possible to form the foundation layer at an optional location. Further, since it is possible to selectively form the foundation layer on the portion on which the glitter ink is provided, it is possible to reduce the amount of the used resin ink, and thus the embodiment is economically superior. In addition, the duty of the resin ink, which is used to form the foundation layer, to be described later is not particularly limited. However, the duty is preferably 100% or more, and is more preferably 300% or more. Thereby, it is possible to obtain high glitter (gloss) and high resistance to friction.

The average film thickness of the foundation layer is preferably 0.1 μm or more and 30 μm or less, and is more preferably 1 μm or more and 15 μm or less. Thereby, it is possible to form an image with a high glitter property.

Furthermore, in the embodiment, the method of using the ink jet apparatus as a mechanism for providing the resin ink is described, but the invention is not limited to this, and it may be possible to select a known technique. For example, the resin ink may be provided by using analog coaters such as a bar coater, a blade coater, a roll coater, a spray coater, and a slit coater which have been used heretofore. The analog coater has advantages in that the viscosity of the resin ink is restricted in a wide range and the resin ink can be coated at a high speed. Examples of commercialized products of the analog coater include a K-hand coater (manufactured by Matsuo Sangyo Co., Ltd.), a bar coater (manufactured by Daiichi Rika Co., Ltd.), a capillary-coater for a small-size substrate and a small capacity type (manufactured by Hirano Tecseed Co., Ltd.), a No579 bar coater (manufactured by Yasuda Seiki Seisakusho Ltd.), and the like.

Further, the surface roughness of the resin ink layer has a close relationship with the glossy of the resin ink layer. As will be described in FIG. 2, there is also a close relationship between the glossy of the resin ink layer and the glossy of the glitter ink layer. In the range of the refractive index (1.4 to 1.6) of the quite appropriate resin contained in the resin ink according to the embodiment of the invention, the 60-degree glossy of the resin ink layer is preferably 20 or more, is more preferably 45 or more, is further more preferably 70 or more, and is even more preferably 90 or more. Here, the 60-degree glossy of the resin ink layer can be measured by using a commercially available glossmeter. In addition, the 60-degree glossy of the above-mentioned resin ink layer is defined as a value which is measured at the turning angle of 60° by using the glossmeter (MINOLTA MULTI GLOSS 268).

Drying Process

The foundation layer formation process may include a drying process. The drying process dries the foundation layer, which is formed as described above, by heating of a heating mechanism. With such a process, it is possible to further improve the function of the foundation layer as the ink-receptive layer, and thus it is possible to further improve adhesiveness of the formed image to the printing medium. As a result, it is possible to form the printed matter which has higher resistance to friction. Further, by improving the function of the foundation layer as the ink-receptive layer, the glitter pigment can be arranged to be smoother, and thus it is possible to exhibit higher gloss (glitter).

The sentence "the foundation layer formation process includes the drying process" is defined to include a case where the drying process is combined with the formation of the foundation layer (also including a case where the drying process is performed during the glitter ink printing process), or a case where the drying process is performed after the foundation formation is completed. That is, in this case, an integrated process including the drying process is the foundation layer formation process.

As the heating mechanism, the platen 3 may be heated so as to function as a heater, a heater line and the like may perform heating through radiant heat, and a warm-air blowing mechanism may be provided in the apparatus so as to thereby perform heating. Further, other known heating mechanisms may be used.

In addition, the drying process is advantageous in that the shape of the smooth surface of the foundation layer is early maintained, but it is not indispensable to provide the drying process. Further, the method of maintaining the shape of the foundation layer may be a method of curing the resin ink by using activated energy rays. The activated energy rays are not particularly limited so far as they are able to apply energy capable of generating an initiation seed from a polymerization initiator through the irradiation. In addition, examples of the activated energy line broadly include α-rays, γ-rays, X-rays, ultraviolet rays, visible rays, electron rays, and the like. Above all, from viewpoints of curing sensitivity and apparatus availability, as the activated energy rays, ultraviolet rays and electron rays are preferable, and particularly ultraviolet rays are more preferable.

The heating temperature (the drying temperature) is appropriately determined depending on the heat resistance of the above-mentioned printing medium, but is preferably 30° C. or more and 120° C. or less, and is more preferably 40° C. or more and 80° C. or less. Thereby, it is possible to increase the drying speed of the resin ink. As a result, it is possible to efficiently form the printed matter which has high resistance to friction.

Glitter Ink Printing Process

In this process, the liquid droplets of the glitter ink are discharged onto the foundation layer by using the above-mentioned ink jet apparatus, and are attached to the printing medium, thereby forming an image on the printing medium. Thereby, it is possible to obtain the printed matter (the printed matter according to the embodiment of the invention).

The film thickness of the image is preferably 0.02 to 10 μm, and is more preferably 0.05 to 5 μm. When the film thickness of the glitter layer is less than 0.02 μm, the printing surface may not have a glitter property.

This process can be performed at, for example, room temperature, and may be performed at a higher temperature than that. In the case of the high temperature, it is possible to increase the drying speed of the glitter ink when the glitter ink contains a solvent. In the case of the high temperature, the temperature is preferably 30° C. or more and 120° C. or less, and is more preferably 40° C. or more and 80° C. or less.

In addition, the printing method may have a first foundation layer formation process, which includes the drying process, and a second foundation layer formation process which does not include the drying process. With such a configuration, when the printed matter with high gloss (glitter) is intended to be provided, the foundation layer is formed in the first foundation layer formation process, and thereafter printing is performed. When the printed matter with slightly suppressed gloss is intended to be provided, the foundation layer is formed in the second foundation layer formation process, and thereafter printing is performed. As a result, it is possible to exhibit a wider range of gloss. Further, when the printing medium which has a high gloss area and a slightly suppressed gloss area is intended to be provided, by providing the drying process of performing partial heating (for example, partially blowing warm air, partially heating the platen, and so on), it is possible to obtain printed matter with a desired gloss. Furthermore, the glitter ink is printed on the area which is intended to have slightly suppressed gloss (by using the second foundation layer formation process), thereafter the drying process is added, and the glitter ink is printed again on the area which is intended to have high gloss (by using the first foundation layer formation process), whereby it is possible to obtain printed matter with a desired gloss. That is, in this case, the foundation layer formation process which is performed first corresponds to the second foundation layer formation process. In addition, the foundation formation process, which is performed first, combined with the drying process, which is performed after the printing of the glitter ink, corresponds to the first foundation layer formation process.

Ink Set

Next, an ink set applied to the above-mentioned ink jet printing method will be described.

The ink set for ink jet printing according to the embodiment is an ink set used to print a glittery image on the above-mentioned non-ink-absorption or low-ink-absorption printing medium by using the ink jet printing apparatus, and has at least the resin ink and the glitter ink.

In addition, the ink set may have the single resin ink and the single glitter ink or a plurality of resin inks and a plurality of glitter inks, and the ink set may have an ink including the other single ink or a plurality of other inks. Examples of the other ink provided in the ink set include: color inks of cyan, magenta, yellow, light cyan, light magenta, dark yellow, red, green, blue, orange, violet, and the like; black ink; light black ink; and the like.

Resin Ink

The resin ink according to the embodiment includes a water-soluble resin solvent (dispersion medium) and a resin compatible with the water-soluble resin solvent as a resin component. The compatibility means a combination in which, when the resin is mixed into the water-soluble resin solvent, the resin is dissolved or the particles thereof swell. In addition, in the embodiment of the invention, the resin ink may be either one of aqueous ink (with a water content of 50% or more) and nonaqueous ink (with a water content of less than 50%). Hereinafter, in the case of the aqueous ink as a specific example, the respective components thereof will be described.

1. Water

Water is a principal medium of the aqueous ink, and preferable water is water in which ionic impurities are reduced as much as possible, and it is possible to use pure water such as ion-exchange water, ultra-filtrated water, reverse osmosis water, or distilled water, or ultrapure water. Further, when using water which is sterilized by ultraviolet ray irradiation, addition of hydrogen peroxide, or the like, it is possible to prevent fungi and bacteria from occurring when storing the pigment dispersion liquid and the aqueous ink using this for a long period of time, and thus the water is appropriate.

2. Water-Soluble Resin Solvent

The water-soluble resin solvent is selected from the water-soluble solvents compatible with the resin added to the resin ink. There is an optimal composition depending on the used resin, but for example, the following solvents are preferable: a water-soluble heterocyclic compound; water-soluble alkylene glycol alkyl ether; pyrrolidones such as N-methyl-2-pyrrolidone, N-ethyl-2-pyrrolidone, N-vinyl-2-pyrrolidone, and 2-pyrrolidone; lactones such as γ-butylol lactone; sulfoxides such as dimethyl sulfoxide; lactams such as ε-caprolactam; esters such as methyl lactate, ethyl lactate, isopropyl lactate, and butyl lactate; oxyalkylene glycol ethers such as ethylene glycol monomethyl ether, ethylene glycol dimethyl ether, ethylene glycol monomethyl ether acetate, diethylene glycol monomethyl ether, diethylene glycol dimethyl ether, diethylene glycol ethyl methyl ether, diethylene glycol diethyl ether, diethylene glycol isopropyl ether, propyleneglycol monomethyl ether, propyleneglycol dimethyl ether, dipropylene glycol monomethyl ether, dipropylene glycol dimethyl ether, and dipropylene glycol monopropyl ether;

and cyclic ethers such as 1,4-dioxane. Particularly, in terms of preservation stability of the resin ink, a sufficient drying speed, and promotion of coating of the foundation layer, the following solvents are preferable: pyrrolidones; and alkylene glycol monoalkyl ethers such as propylene glycol monomethyl ether, dipropylene glycol monomethyl ether, and dipropylene glycol monopropyl ether.

The additive the amount of water-soluble resin solvent relative to the total amount of resin ink is preferably 1.0 weight % or more and 20.0 weight % or less, and is more preferably 2.0 weight % or more and 15.0 weight % or less. If the additive amount of water-soluble resin solvent is less than the lower limit, in accordance with the type of the resin component, it may be difficult to form a coat of resin and foundation formation wax within the resin ink. As a result, it may not be sufficient to solidify and fix the resin ink. In contrast, if the additive amount of water-soluble resin solvent is more than the upper limit, preservation stability of the resin ink may be lowered.

3. Resin (Resin Component)

The resin is compatible with the water-soluble resin solvent, and is used to form a hard resin film (the foundation layer) after the drying of the resin ink.

In the case of using the resin in the ink jet apparatus, by using a resin which can be dispersed in water, it is possible to suppress the viscosity of each ink while adding a sufficient amount of resin component into the resin ink. Accordingly, it is preferable to use the resin since it is possible to secure discharge stability in the case of high-speed printing.

Specific examples of the resin, which is dispersible in water, include polyacrylic acid, polymethacrylic acid, polymethacrylic acid ester, polyethyl acrylic acid, styrene-butadiene copolymer, polybutadiene, acrylonitrile-butadiene copolymer, chloroprene copolymer, fluorine resin, vinylidene fluoride, polyolefin resin, cellulose, styrene-acrylic acid copolymer, styrene-methacrylic acid copolymer, polystyrene, styrene-acrylamide copolymer, polyisobutyl acrylate, polyacrylonitrile, polyvinyl acetate, polyvinyl acetal, polyamide, rosin resin, polyethylene, polycarbonate, vinylidene chloride resin, cellulosic resin such as cellulose acetate butyrate, vinyl acetate resin, ethylene-vinylacetate copolymer, vinylacetate-acryl copolymer, vinyl chloride resin, polyurethane, rosin ester, and the like. The resin is not limited to these examples.

Among the above-mentioned resin, it is preferable to use, as a resin component, particularly styrene-acryl resin and at least one resin selected from the group formed of polyurethane. Since these components are excellent in film formation, it is possible to form a smoother foundation layer. As a result, it is possible to further improve the glitter of the formed image. Further, it is possible to further increase adhesiveness of the image to the printing medium, and thus it is also possible to further improve resistance to friction.

The resin may be dissolved in the dispersion medium, or may be dispersed in the form of microparticles. However, it is preferable that the resin should be included in the ink in the form of a resin emulsion. The reason is that, since dispersion of the resin particles is not sufficient although the resin is added into the ink as resin particles, the emulsion form is preferable from the viewpoint of dispersibility. As the emulsion, from the viewpoint of preservation stability of the resin ink, acryl emulsion is preferable, and styrene-acrylic acid copolymer emulsion is more preferable.

In the specification of the present application, the term "resin particles" means that the water-insoluble resin is dispersed in the dispersion medium mainly formed of water in the form of particles, or means the water-insoluble resin, which is dispersed in the dispersion medium mainly formed of water in the form of particles, further including the dried matter of the resin. Further, the term "emulsion" is defined to include solid/liquid dispersion elements called a dispersion, latex, and a suspension.

When the resin is obtained in the emulsion state, the resin particles can be prepared by mixing the resin and the surfactant with water. For example, the emulsion of acrylic resin or styrene-acrylate copolymer-based resin can be obtained by mixing the resin of (meth)acrylic acid ester and the resin of the styrene-(meth)acrylic acid ester and possibly mixing the resin of (meth)acrylic acid ester and a surfactant with water. It is preferable that the ratio of the mixture between the resin component and the surfactant should be normally in the range of about 50:1 to 5:1. In a case where the amount of the surfactant used is less than the above-mentioned range, it is difficult to form an emulsion. In addition, in a case where the amount is more than the range, water resistance of the ink may be lowered, or adhesiveness of the ink may deteriorate. Therefore, both cases are not preferable.

As the resin emulsion, a commercially available resin emulsion may be used. Examples of the commercially available resin emulsion may include Microgel E-1002 and E-5002 (styrene-acrylic resin emulsion manufactured by Nippon Paint Corp.), Boncoat 4001 (acrylic resin emulsion manufactured by Dainippon Ink And Chemicals, Inc.), Boncoat 5454 (styrene-acrylic resin emulsion manufactured by Dainippon Ink and Chemicals Inc.), SAE-1014 (styrene-acrylic resin emulsion manufactured by Nippon Zeon Corp.), Resamine D-1060 (urethane resin emulsion manufactured by Dainichiseika Color & Chemicals Mfg. Co., Ltd.), Saivinol SK-200 (acrylic resin emulsion manufactured by Saiden Chemical Industry Co., Ltd.), and the like.

The amount of resin included in the resin ink is preferably in the range of 1 weight % or more and 50 weight % or less, and is more preferably in the range of 6 weight % or more and 25 weight % or less, on the basis of solid content. The preferable ranges of the content of the resin are obtained by defining the upper limit in terms of appropriate physical values of the resin ink for ink jet and reliabilities (in clogging, discharge stability, and the like) and defining the lower limit in terms of efficiently obtaining the advantages of the embodiment of the invention (such as resistance to friction).

4. Wax

The aqueous resin ink may additionally include wax. Thereby, the resin ink has a characteristic of reducing frictional resistance of the film surface of the dried ink. Examples of components constituting the wax includes: plant/animal waxes such as carnauba wax, candalilla wax, beeswax, rice wax, and lanolin; petroleum waxes such as a paraffin wax, a microcrystalline wax, polyethylene wax, an oxidized polyethylene wax, and a petrolatum; mineral waxes such as montan wax and ozokerite; synthetic waxes such as carbon wax, Hoechst wax, a polyolefin wax, a stearic acid amide, and the like; emulsions of natural and synthetic waxes such as α-olefin-maleic anhydride copolymer; and compound waxes. These components can be used alone or in combination. Preferable waxes among these are the polyolefin wax, particularly, polyethylene wax, and polypropylene wax. In addition, from the viewpoint of the resistance to friction of the non-ink-absorption or low-ink-absorption printing medium, polyethylene wax is more preferable. As the wax, a commercialized product may be used as it is. Examples of the commercialized product include Nopcote PEM17 (trade name, manufactured by San Nopco Ltd.), Chemipearl W4005 (trade name, manufactured by Mitsui Chemicals, Inc.), or Aquacer 515 (trade name, manufactured by BYK Japan KK).

The content of wax in the aqueous resin ink is preferably 0.5 weight % to 6 weight %, and more preferably 1 weight % to 3 weight % on the basis of solid content in the resin ink. The preferable ranges of the content of the wax are obtained by defining the upper limit in terms of appropriate physical values of the resin ink for ink jet and reliabilities (in clogging, discharge stability, and the like) and defining the lower limit in terms of efficiently obtaining the advantages of the embodiment of the invention (such as resistance to friction).

In the printed matter which is formed by forming the layer of the above-mentioned resin ink and printing the glitter pigment layer thereon, the glitter pigment can be arranged to be smooth, thereby increasing gloss thereof. Further, with such a configuration, even printing media, which had difficulty in being made glittery in the past, can be made to be glittery. Furthermore, resistance to friction of the printed matter becomes better, and thus it is possible to form a hard foundation layer. The reason why the resistance to friction thereof becomes better is not yet clear, but is inferred to be as follows. The resin is fixed on the printing medium, and has a characteristic of hardening the coat after the drying. On the other hand, the wax has a characteristic of reducing frictional resistance of the surface of the coat. Thereby, it is possible to form a resin coat which is resistant to scratches from the outside and is unlikely to be peeled off from the printing medium, and thus it can be inferred that the resistance to friction of the printed matter is improved. Further, when the layer is formed of the resin ink, the resin ink also functions as the ink-receptive layer, and thus there is an advantage in suppressing bleed of the glitter pigment on the printing medium. As a result, it is possible to perform favorable printing. Furthermore, even if the fixability and the drying characteristic of the glitter ink itself can be dramatically improved, in order to secure glossy, it is necessary for the average particle size of the pigment particles to be set to be large. Hence, when the printing is performed by the head, printing reliability may be lowered, and thus there is even a possibility of further causation of clogging and printing errors. Therefore, considering that the above-mentioned problems do not occur, it is advantageous to form the resin ink layer.

5. Other Components

As other components, the resin ink includes a water-soluble solvent and a surfactant as necessary. The additive amount can be appropriately adjusted in accordance with the type of the printing medium and the type of the ink. The following components are further added as necessary: a moisturizer, a preservative fungicide, a pH adjuster, a dissolution aid, an antioxidant ultraviolet absorber, a metal trapping agent, and the like.

5-1. Water-Soluble Solvent

The water-soluble solvent has a function of uniformly wetting the printing medium by increasing wettability of the resin ink to the printing medium through synergy with the surfactant to be described later. Hence, it is preferable that the resin ink should contain the water-soluble solvent in that it is possible to uniformly form the foundation layer. Examples of the water-soluble solvent include monovalent alcohols, polyvalent alcohols, and derivatives thereof.

As the monovalent alcohol, particularly, monovalent alcohols with 1 to 4 carbon atoms may be used. For example, methanol, ethanol, n-propanol, i-propanol, n-butanol, or the like may be used.

As the polyvalent alcohol and derivates thereof, it is possible to use a complete or partial ether of di-to-tetra-valent alcohols with 2 to 6 carbon atoms and lower alcohols with 1 to 4 carbon atoms. Here, the polyvalent alcohol derivative is an alcohol derivative which is formed by etherifying at least one hydroxyl group, and does not mean the polyvalent alcohol itself which does not include an etherified hydroxyl group.

Specific examples of the polyvalent alcohol and the lower alkyl ether include: diols such as 1,2-hexanediol, 1,3-hexanediol, 1,2-heptanediol, 1,3-heptanediol, 1,2-octanediol, 1,3-octanediol, and 1,2-pentanediol; mono-, di-, or tri-ethylene glycol mono- or di-alkyl ether; and mono-, di-, or tri-propylene glycol mono- or di-alkyl ether. Preferably, examples of the polyvalent alcohol and the lower alkyl ether include 1,2-hexanediol, triethylene glycol monobutyl ether, diethylene glycol monobutyl ether, diethylene glycol monopropyl ether, diethylene glycol monopentyl ether, propylene glycol monobutyl ether, and the like.

The content of the water-soluble solvent is, for example, 0.5 weight % or more and 15.0 weight % or less, and is preferably 1.0 weight % or more 8.0 weight % or less.

5-2. Surfactant

The surfactant has a function of uniformly wetting the printing medium by increasing wettability of the color ink to the printing medium through synergy with the above-mentioned water-soluble solvent. As the surfactant, a silicon surfactant and an acetylene glycol surfactant are preferable.

The silicon surfactant has a function of uniformly spreading the ink so as not to cause print blob or running of the ink on the printing medium.

As the silicon surfactant, a polysiloxane compound, and the like are preferably used. For example, polyether-modified organosiloxane and the like may be used. Specific examples of the silicon surfactant include BYK-306, BYK-307, BYK-333, BYK-341, BYK-345, BYK-346, BYK-347, and BYK-348 (trade names, manufactured by BYK Japan KK), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade name, manufactured by Shin-Etsu Chemical Co., Ltd.), and the like. Here, BYK-348 is preferable.

The content of the silicon surfactant relative to the total amount of the respective color inks is preferably 0.1 weight % or more and 1.5 weight % or less. If the content of the silicon surfactant is not less than 0.1 weight %, the ink is unlikely to uniformly wet the printing medium and uniformly spread on the printing medium. Hence, print blob and bleed of the ink tends to occur. In contrast, if the content of the silicon surfactant is more than 1.5 weight %, sometimes, preservation stability and discharge stability of the aqueous ink may not be secured.

The acetylene glycol surfactant is excellent in maintaining surface tension and interfacial tension as compared with the other surfactants, and has a characteristic of having hardly any foaming property. Thereby, the color ink, which contains the acetylene glycol surfactant, is able to appropriately maintain surface tension and interfacial tension between the ink and the printer member such as the head nozzle surface which comes into contact with the ink. Hence, when this is applied to an ink jet printing method, it is possible to increase discharge stability. Further, the color ink, which contains the acetylene glycol surfactant, has favorable wettability and permeability, and thus it is possible to obtain a high-resolution image in which print blob and bleed of ink is less likely to occur.

Examples of the acetylene glycol surfactant include: Surfynol 104, 104E, 104H, 104A, 104BC, 104DPM, 104PA, 104PG-50, 104S, 420, 440, 465, 485, SE, SE-F, 504, 61, 82, DF37, DF110D, CT111, CT121, CT131, CT136, TG, and GA (trade names, manufactured by Air Products and Chemicals. Inc.); Olfin B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (trade names, manufactured by Nissin Chemical Industry, Co., Ltd.); Acetylenol E00, E00P, E40, and E100 (trade names, manufactured by Kawaken Fine Chemicals, Co., Ltd.); and the like. Here, Surfynol 104PG-50 and DF110D are preferable.

The content of the acetylene glycol surfactant relative to the total amount of the respective color inks is preferably 0.05 weight % to 1.0 weight %. If the content of the acetylene glycol surfactant is less than 0.05 weight %, the ink is unlikely to uniformly wet the printing medium and uniformly spread on the printing medium. Hence, print blob and bleed of the ink tends to occur. In contrast, if the content of the acetylene glycol surfactant is more than 1.0 weight %, sometimes, preservation stability and discharge stability of the color inks may not be secured.

In particular, a composition including the silicon surfactant and the acetylene glycol surfactant of which the HLB value is 6 or less is preferable.

In the above-mentioned composition between the water-soluble solvent and the surfactant, the surface tension of the aqueous ink is used preferably in the range of 23.0 mN/m to 40.0 mN/m, and more preferably in the range of 25.0 mN/m to 35.0 mN/m.

5-3. Moisturizer

Examples of the moisturizer include: polyvalent alcohols such as ethylene glycol, diethylene glycol, propylene glycol, dipropylene glycol, 1,3-propanediol, 1,4-butanediol, hexylene glycol, and 2,3-butanediol; saccharides; a sugar alcohol; and the like.

5-4. Preservative/Fungicide

Examples of the preservative/fungicide include sodium benzoate, sodium pentachlorophenol, sodium 2-pyridinethiol-1-oxide, sodium sorbate, sodium dehydroacetate, and 1,2-dibenzisothiazolin-3-one (Proxel CRL, Proxel BDN, Proxel GXL, Proxel XL-2, Proxel TN manufactured by ICI Co., Ltd.), and the like.

5-5 pH Adjuster

Examples of the pH-adjuster include: amines such as diethanolamine, triethanolamine, propanolamine, and morpholine; metamorphosed substances thereof; inorganic salts such as potassium hydroxide, sodium hydroxide, and lithium hydroxide; ammonium hydroxide; quaternary ammonium hydroxides (such as tetramethyl ammonium); carbonate salts such as potassium carbonate, sodium carbonate, and lithium carbonate; other phosphoric salts; and the like.

5-6. Dissolution aid

Examples of the dissolution aid include urea, thiourea, dimethylurea, tetraethylurea, and the like.

5-7. Antioxidant/Ultraviolet Absorber

Examples of the antioxidant/ultraviolet absorber include: allophanates such as allophanate and methylallophanate; biurets such as biuret, dimethylbiuret and tetramethylbiuret; L-ascorbic acid and a salt or the like; Tinuvin 328, 900, 1130, 384, 292, 123, 144, 622, 770, 292, Irgacor 252, 153, Irganox 1010, 1076, 1035, MD1024 and the like manufactured by Nihon Ciba-Geigy K.K.; lanthanide oxide; and the like.

5-8. Metal trapping Agent

Examples of the metal trapping agent include chelate agents such as disodium ethylenediamine tetraacetate, and the like.

5-9. Polymerizable Compound and Polymerization Initiator

When the resin ink is cured through a polymerization reaction caused by the activated energy rays, the resin ink may include a polymerizable compound, a polymerization initiator, and the like used in the related art. Examples of the polymerization initiator include benzoin methyl ether, benzoin ethyl ether, isopropyl benzoin ether, isobutyl benzoin ether, 1-phenyl-1,2-propanedione-2-(o-ethoxycarbonyl) oxime, benzyl, diethoxyacetophenone, benzophenone, chlorothioxanthone, 2-chlorothioxanthone, isopropylthioxanthone, 2-methylthioxanthone, polychlorinated polyphenyl, hexachlorobenzene, and the like.

Further, examples of the polymerizable compound include polyester acrylate, polyurethane acrylate, epoxy acrylate, polyether acrylate, oligoacrylate, alkyd acrylate, polyol acrylate, diethylene glycol diacrylate, neopentyl glycol diacrylate, 1,6-hexanediol diacrylate, hydroxypioperine acid ester neopentyl glycol diacrylate, trimethylol propane triacrylate, pentaerythritol triacrylate, dipentaerythritol hexaacrylate, acroylmorpholine, 2-phenoxy ethyl acrylate, hydrogen-(2,2, 2-triacryloxy methyl)ethyl phthalate, dipentaerythritol polyacrylate, dipentaerythritol polyacrylate, N-vinyl formamide, tripropylene glycol diacrylate, glycerin EO adduct triacrylate, and the like.

Glitter Ink

The aqueous glitter ink (hereinafter simply referred to as glitter ink) contains a glitter pigment, and water by an amount of 50 weight % or more (aqueous ink). Regarding the glitter pigment contained in the glitter ink, any glitter pigment can be used so far as liquid droplets of the ink containing the pigment can be discharged in the ink jet printing method. The glitter pigment has a function of imparting glitter when the glitter ink is attached onto the resin ink layer, and is also able to impart glitter to the attachment. Examples of the glitter pigment include pearl pigment and metallic particles. The typical examples of the pearl pigment include: pearl gloss pigments such as mica covered by titanium dioxide, argentine, and acid bismuth chloride; and pigments having interference gloss. On the other hand, the examples of the metal particles include aluminum, silver, gold, platinum, nickel, chromium, tin, zinc, indium, titanium, and copper. At least one selected from these elemental metals, alloys thereof, and mixtures thereof may be used.

As the glitter pigment used in the embodiment, it is preferable to use silver particles in terms of the level of glossy (glitter). Hereinafter, as a specific example of the glitter ink, silver ink will be described.

1. Silver Particle

As described above, the silver ink according to the embodiment includes silver particles. In such a manner, the silver ink include the silver particles (particularly, also including wax satisfying a predetermined condition), and thus it is possible to form an image with excellent metallic gloss. Further, silver has a high whiteness level among various metals, and thus, by using a combination with inks of other colors, it is possible to render various metallic colors such as gold and copper.

The average particle diameter of the silver particles is preferably 5 nm or more and 100 nm or less, and is more preferably 20 nm or more and 65 nm or less. Thereby, it is possible to particularly improve glossy (glitter) of the image, which is formed by using the silver ink, and resistance to friction. Further, it is possible to particularly improve discharge stability (accuracy in landing position, and stability in the amount of discharge) based on the ink jet method, and thus it is also possible to more reliably form an image with a desired image quality for a long period of time. In addition, in the specification, the term "average particle diameter" indicates an average particle diameter based on the volume thereof. The average particle diameter can be measured by the particle-size distribution measurement apparatus using the laser diffraction scattering method as a measurement principle. As the laser-diffraction-type particle-size distribution measurement apparatus, for example, it is possible to use the particle-size distribution measurement apparatus (for example, "Microtrac UPA" manufactured by Nikkiso Co., Ltd.) using the dynamic light scattering method as a measurement principle.

The content ratio of the silver particles in the silver ink is preferably 0.5 weight % or more and 30 weight % or less, and is more preferably 5.0 weight % or more and 15 weight % or less. Thereby, it is possible to particularly improve discharge stability based on the ink jet method of the ink and preservation stability of the ink. Further, in a wide range of density from a low density (content per unit area) of the silver particles on the printing medium in a state of the printed matter to a high density thereof, it is possible to achieve favorable image quality and resistance to friction.

The silver particles may be prepared by any method. For example, the solution including silver ions is provided, and the silver ions are resolved, thereby appropriately forming the silver particles.

2. Resin

The silver ink according to the embodiment of the invention may contain resin. By containing resin, fixability and resistance to friction are improved. Examples of the resin include polyacrylic acid, polymethacrylic acid, polymethacrylic acid ester, polyethyl acrylic acid, styrene-butadiene copolymer, polybutadiene, acrylonitrile-butadiene copolymer, chloroprene copolymer, fluorine resin, vinylidene fluoride, polyolefin resin, cellulose, styrene-acrylic acid copolymer, styrene-methacryl acid copolymer, polystyrene, styrene-acrylamide copolymer, polyisobutyl acrylate, polyacrylonitrile, polyvinyl acetate, polyvinyl acetal, polyamide, rosin resin, polyethylene, polycarbonate, vinylidene chloride resin, cellulosic resin such as cellulose acetate butyrate, vinyl acetate resin, ethylene-vinylacetate copolymer, vinylacetate-acryl copolymer, vinyl chloride resin, polyurethane, rosin ester, and the like. The resin is not limited to these examples.

3. Water

The ink according to the embodiment of the invention includes water.

The water in the ink functions as a dispersion medium for mainly dispersing the silver particles and the wax particles. When the ink includes water, it is possible to improve dispersion stability of the silver particles and the like. In addition, while preventing the ink in the vicinity of the nozzles of the liquid droplet discharging apparatus to be described later from involuntarily drying, it is possible to promptly dry the ink provided on the printing medium. Hence, it is possible to perform high-speed printing of a desired image for a long period of time. The content ratio of the water in the ink is not particularly limited, but is preferably 20 weight % or more and 80 weight % or less, and is more preferably 25 weight % or more and 70 weight % or less.

4. Polyvalent Alcohol

It is preferable that the ink according to the invention should contain polyvalent alcohol. When the ink according to the embodiment is applied to the ink jet printing apparatus, the polyvalent alcohol is able to prevent the ink jet printing head portion from clogging by suppressing the drying of the ink.

Examples of the polyvalent alcohol include ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, trimethylolpropane, 1,2-butanediol, 1,2-pentanediol, 1,2-hexanediol, 1,2-heptanediol, 1,2-octanediol, and the like. Among them, alkanediols with 4 to 8 carbon atoms are preferable, and alkanediols with 6 to 8 carbon atoms are more preferable. Thereby, it is possible to particularly increase permeability to the printing medium. The content ratio of the polyvalent alcohol in the ink is not particularly limited, but is preferably 0.1 weight % or more and 20 weight % or less, and is more preferably 0.5 weight % or more and 10 weight % or less.

It is preferable that the ink should include 1,2-hexanediol and trimethylolpropane among the polyvalent alcohols. Thereby, it is possible to particularly improve dispersion stability of the silver particles in the ink, it is possible to particularly improve preservation stability of the ink, and it is possible to particularly improve discharge stability of the ink.

5. Glycol Ether

It is preferable that the ink according to the embodiment of the invention should contain glycol ether. Since the ink contains glycol ether, it is possible to increase permeability of the ink by increasing wettability to the target printing surface of the printing medium or the like.

Examples of glycol ether includes lower alkyl ethers of polyvalent alcohols such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, triethylene glycol monobutyl ether, and tripropyleneglycol monomethyl ether. When the triethylene glycol monobutyl ether thereof is used, it is possible to obtain favorable printing quality. The content ratio of the glycol ether in the ink is not particularly limited, but is preferably 0.2 weight % or more and 20 weight % or less, and is more preferably 0.3 weight % or more and 10 weight % or less.

6. Surfactant

It is preferable that the ink according to the embodiment of the invention should contain an acetylene glycol surfactant or a polysiloxane surfactant. The acetylene glycol surfactant or the polysiloxane surfactant is able to increase permeability of the ink by increasing wettability to the target printing surface of the printing medium or the like.

Examples of the acetylene glycol surfactant include 2,4,7,9-tetramethyl-5-decyne-4,7-diol, 3,6-dimethyl-4-octyne-3,6-diol, 3,5-dimethyl-1-hexyne-3-ol, 2,4-dimethyl-5-hexyne-3-ol, and the like. Further, as the acetylene glycol surfactant, the following commercialized products may be used: for example, Olfin E1010, STG, Y (manufactured by Nissin Chemical Industry CO., Ltd.), and Surfynol 104, 82, 465, 485, TG (manufactured by Air Products and Chemicals Inc.).

As the polysiloxane surfactant, the following commercialized products may be used: for example, BYK-347, BYK-348 (manufactured by BYK Japan KK), and the like.

The ink according the embodiment of the invention may contain other surfactants such as an anionic surfactant, a nonionic surfactant, or an ampholytic surfactant.

The content ratio of the surfactant in the ink is not particularly limited, but is preferably 0.01 weight % or more and 5.0 weight % or less, and is more preferably 0.1 weight % or more and 0.5 weight % or less.

7. Other Components

The ink according to the embodiment of the invention may include other components (components other than these). Examples of the components include a pH adjuster, a penetrating agent, an organic binder, a urea compound, antidrying agents such as alkanolamines (triethanolamine and the like), thiourea, and the like.

The preferred embodiment of the invention has been hitherto described, but the invention is not limited to this.

EXAMPLES

Next, specific examples of the embodiment of the invention will be described.

1. Preparation of Resin Ink

The resin ink was prepared by mixing a resin component, a water-soluble organic solvent, a surfactant, a wax, and ion-exchange water so as to have the composition shown in Table 1. Hereafter, the mixture thereof was stirred for one hour at room temperature, and thereby resin inks 1 to 4 shown in Table 1 were obtained.

The components used in Table 1 were as follows.
1. Resin Components
   styrene-acrylic acid copolymer (thermoplastic resin particle, average particle diameter 50 nm, molecular weight 55000, glass transition temperature 80° C., acid number 130)
   polyurethane (Resamine D-2020, manufactured by Dainichiseika Color & Chemicals Mfg. Co., Ltd.)
2. Water-Soluble Organic Solvents
   1,2-hexanediol
   2-pyrrolidone
   propylene glycol
3. Surfactants
   silicon surfactant (manufactured by BYK Japan KK, trade name "BYK-348", polyether-modified siloxane)
   acetylene glycol surfactant (manufactured by Nissin Chemical Industry, Co., Ltd., trade name "Surfynol 104PG-50")
4. Polyolefin Waxes
   polyethylene wax (manufactured by BYK Japan KK, trade name "AQUACER-515")

condition of 120° C., the silver nitrate solution was added thereto, and the solution was heated for 80 minutes, whereby the reaction was advanced. Then, the solution was cooled down to the room temperature. The obtained solution was subjected to centrifugal separation for 10 minutes under the condition of 2200 rpm by a centrifugal separator. Subsequently, the separated silver particles were extracted, and were added to an ethanol solution of 500 ml in order to remove the remaining PVP. Then, by performing the centrifugal separation again, and the silver particles were extracted. Further, the extracted silver particles were dried by a vacuum drier under the condition of 35° C. and 1.3 Pa.

In the prepared silver particles of 10 weight %, the following were added: triethylene glycol monobutyl ether of 5 weight %, glycerin of 5 weight %, 1,2-hexanediol of 1.5 weight %, trimethylol propane of 1.5 weight %, silicon surfactant (BYK-348) of 1 weight %, and the ion-exchange water for concentration adjustment, whereby the glitter ink 1 was formed.

2. Glitter Ink 2

On the PET film with a film thickness of 100 μm a resin layer coating solution, which was composed of cellulose acetate butyrate (a butylation rate of 35 to 39%, manufactured by Kanto Chemical Co., Inc.) of 3.0 weight % and diethylene glycol diethyl ether (manufactured by Nippon Nyukazai Co., Ltd.) of 97 weight %, was uniformed coated in the bar coat method, and was dried at 60° C. for 10 minutes, whereby the resin layer thin film was formed on the PET film.

Subsequently, by using a vacuum evaporation apparatus ("VE-1010-type vacuum evaporation apparatus", manufactured by Vacuum Device Inc.), an aluminum-deposited layer with an average film thickness of 20 nm was formed on the resin layer.

TABLE 1

|  | RESIN INK 1 [WEIGHT %] | RESIN INK 2 [WEIGHT %] | RESIN INK 3 [WEIGHT %] | RESIN INK 4 [WEIGHT %] |
| --- | --- | --- | --- | --- |
| STYRENE ACRYL RESIN | 5 | 5 | 0 | 25 |
| POLYURETHANE | 0 | 0 | 5 | 0 |
| 1,2-HEXANEDIOL | 5 | 5 | 5 | 5 |
| 2-PYRROLIDONE | 4 | 4 | 4 | 4 |
| PROPYLENE GLYCOL | 12 | 12 | 12 | 0 |
| SILICON SURFACTANT | 0.5 | 0.5 | 0.5 | 0.5 |
| ACETYLENE SURFACTANT | 0.2 | 0.2 | 0.2 | 0.2 |
| POLYETHYLENE WAX | 2 | 0 | 0 | 0 |
| ION-EXCHANGE WATER | REMAINING AMOUNT | REMAINING AMOUNT | REMAINING AMOUNT | REMAINING AMOUNT |
| SUM | 100 | 100 | 100 | 100 |

2. Preparation of Glitter Ink

1. Glitter Ink 1

Polyvinyl pyrrolidone (PVP, polymerization average molecular weight 10000) was heated under the condition of 70° C. for 15 hours, and was thereafter cooled down to room temperature. The PVP of 1000 g was added to an ethylene glycol solution of 500 ml, whereby the PVP solution was adjusted. The ethylene glycol of 500 ml was put in a different container, silver nitrate of 128 g was added thereto, and then the mixture thereof was sufficiently stirred by an electronic stirrer, whereby the silver nitrate solution was adjusted. While the PVP solution was stirred by an overhead mixer under the Then, a laminated body, which was formed in the method, was subjected to processes of exfoliation, micronization, and dispersion at the same time in diethylene glycol diethyl ether by using a VS-150 ultrasonic disperser (manufactured by As One Corp.), whereby an aluminum pigment dispersion liquid, on which the ultrasonic dispersion process was performed for a total of 12 hours, was prepared.

The obtained aluminum pigment dispersion liquid was subjected to the filtering process by a SUS mesh filter of which the mesh pore size was 5 μm, whereby the coarse particles were removed. Subsequently, the filtrate was put in a round-bottom flask, and diethylene glycol diethyl ether was distilled away therefrom by using a rotary evaporator. Thereby, the aluminum pigment dispersion liquid was concentrated. Thereafter, by adjusting the concentration of the aluminum pigment dispersion liquid, an aluminum pigment dispersion liquid A of 5 weight % was obtained.

Subsequently, the obtained aluminum pigment dispersion liquid A of 100 g was put in a beaker, and 3-methacryloxy propyltrimethoxysilane (manufactured by Shin-Etsu Chemical Co., Ltd., trade name "KBM-503") of 26.93 g was added. Then, by stirring the liquid at room temperature for one day, a hydrolysis reaction was caused. In such a manner, an aluminum pigment dispersion liquid B, in which a covering layer was formed on the surface of the aluminum pigment, was obtained.

Subsequently, the aluminum pigment dispersion liquid B of 100 g was put in a beaker, and trimethoxymethylsilane (manufactured by Tokyo Chemical Industry Co., Ltd.) of 3.69 g was added. Then, by stirring the liquid at room temperature for one day, a hydrolysis reaction was caused. In such a manner, an aluminum pigment dispersion liquid C, in which a process of capping the hydroxyl group remaining on the surface of the aluminum pigment was performed, was obtained.

In the aluminum pigment dispersion liquid C of 5 weight %, the following were added: triethylene glycol monobutyl ether of 5 weight %, glycerin of 5 weight %, 1,2-hexanediol of 1.5 weight %, trimethylol propane of 1.5 weight %, silicon surfactant (BYK-348) of 1 weight %, and the ion-exchange water for concentration adjustment, whereby the glitter ink 2 was formed.

3. Formation of Printed Matter

1. Glitter Ink 1

Examples 1 to 35 and 51 to 70

First, by using PX-G930 (manufactured by Seiko Epson Corp.), the resin inks shown in Tables 2 and 4 were provided on the printing media shown in Tables 2 and 4 in prescribed patterns of duties (%) shown in Tables 2 and 4. In addition, the drying process was provided for each 100% duty (%), and the drying was performed by heating the platen up to 50° C.

Next, by using PX-G930 (manufactured by Seiko Epson Corp.), the glitter inks shown in Tables 2 and 4 were provided on the formed foundation layers in the prescribed patterns of duties (%) shown in Tables 2 and 4 so as to form images, whereby printed matter was obtained.

Examples 36 to 40, 71, and 72

The foundation layers were formed on the printing media shown in Tables 2 and 4 by using the coating apparatuses of the K-hand coater (manufactured by Matsuo Sangyo Co., Ltd., trade name) and the bar No. 7 such that the dried film thickness of the resin ink 4 was 20 µm. The glitter pigment inks were provided thereon in the prescribed patterns of the duties (%) shown in Tables 2 and 4. In addition, the foundation layer was formed by heating to 50° C.

Comparative Examples 1 to 5 and 8

By using PX-G930 (manufactured by Seiko Epson Corp.), the glitter inks shown in Tables 2 and 4 were provided on the printing media in the prescribed patterns of duties (%) shown in Tables 2 and 4 so as to form images, whereby printed matter was obtained.

Reference Examples 1 and 3

By using PX-G930 (manufactured by Seiko Epson Corp.), the glitter inks shown in Tables 2 and 4 were provided on the printing media in the prescribed patterns of duties (%) shown in Tables 2 and 4 so as to form images, whereby printed matter was obtained.

2. Glitter Ink 2

Examples 41 to 50 and 73 to 77

First, the resin inks shown in Tables 3 and 5 were provided on the printing media shown in Tables 3 and 5 in prescribed patterns of duties (%) shown in Tables 3 and 5. In addition, the drying process was provided for each 100% duty (%), and the drying was performed by heating to 50° C.

Next, the glitter inks shown in Tables 3 and 5 were provided on the formed foundation layers in the prescribed patterns of duties (%) shown in Tables 3 and 5 so as to form images, whereby printed matter was obtained.

Comparative Examples 6, 7, and 9

By using PX-G930 (manufactured by Seiko Epson Corp.), the glitter inks shown in Tables 3 and 5 were provided on the printing media in the prescribed patterns of duties (%) shown in Tables 3 and 5 so as to form images, whereby printed matter was obtained.

Reference Examples 2 and 4

By using PX-G930 (manufactured by Seiko Epson Corp.), the glitter inks shown in Tables 3 and 5 were provided on the printing media in the prescribed patterns of duties (%) shown in Tables 3 and 5 so as to form images, whereby printed matter was obtained.

3. Glitter Ink 1

No Drying Process

Examples 78 to 82

First, by using PX-G930 (manufactured by Seiko Epson Corp.), the resin inks shown in Table 6 were provided on the printing media shown in Table 6 in prescribed patterns of duties (%) shown in Table 6. In addition, the inks were provided without the drying process.

Next, by using PX-G930 (manufactured by Seiko Epson Corp.), the glitter inks shown in Table 6 were provided on the formed foundation layers in the prescribed patterns of duties (%) shown in Table 6 so as to form images, whereby printed matter was obtained.

Here, "duty" is a value which is calculated from the following expression.

Duty (%)=actual number of printing dots/(vertical resolution×horizontal resolution)×100 (in the expression, the "actual number of printing dots" is an actual number of printing dots per unit area, and the "vertical resolution" and the "horizontal resolution" are resolutions per respective unit areas.)

Further, in Tables 2 and 3, a PET film (manufactured by Lintec Corp., trade name "PET50A") as a printing medium, of which the amount of water absorbed during the time from start of the contact to 30 msec$^{1/2}$ is 10 mL/m$^2$ or less in the Bristow method, is represented by "PET1"; a PET film (manufactured by Lintec Corp., trade name "K2411") is represented by "PET2"; a synthetic paper (PP: polypropylene) (manufactured by Lintec Corp., trade name "Yupo 80") is represented by "synthetic paper (PP)"; a cast paper (manufactured by Ojitac Co., Ltd., trade name "O mirror 73/F41/U8C") is represented by "cast paper"; and a coat paper (manufactured by Lintec Corp., trade name "NPcoat_PW8E") is represented by "coat paper". Furthermore, a photo paper (photo paper <gloss>, manufactured by Seiko Epson Corp.) is represented by "photo paper".

Further, in Tables 4, 5, and 6, a high-quality paper (manufactured by Lintec Corp., trade name "55PW8R") as a printing medium is represented by "high-quality paper"; and a plain paper (manufactured by Fuji Xerox Co., Ltd., trade name "XeroxP"; arithmetic average roughness Ra=29.2 μm) is represented by "plain paper". Furthermore, a photo paper (photo paper <gloss>, manufactured by Seiko Epson Corp., arithmetic average roughness Ra=1.13 nm) is represented by "photo paper".

TABLE 2

| | RESIN INK | | GLITTER INK | | RECORDING MEDIUM | EVALUATION | |
|---|---|---|---|---|---|---|---|
| | TYPE | duty | TYPE | duty | TYPE | GLOSSY EVALUATION | RESISTANCE TO FRICTION |
| EXAMPLE 1 | RESIN INK 1 | 500% | GLITTER INK 1 | 40% | PET1 | S | A |
| EXAMPLE 2 | RESIN INK 1 | 400% | GLITTER INK 1 | 40% | PET1 | S | A |
| EXAMPLE 3 | RESIN INK 1 | 300% | GLITTER INK 1 | 40% | PET1 | S | A |
| EXAMPLE 4 | RESIN INK 1 | 200% | GLITTER INK 1 | 40% | PET1 | S | A |
| EXAMPLE 5 | RESIN INK 1 | 100% | GLITTER INK 1 | 40% | PET1 | A | A |
| EXAMPLE 6 | RESIN INK 1 | 500% | GLITTER INK 1 | 40% | PET2 | A | A |
| EXAMPLE 7 | RESIN INK 1 | 400% | GLITTER INK 1 | 40% | PET2 | A | A |
| EXAMPLE 8 | RESIN INK 1 | 300% | GLITTER INK 1 | 40% | PET2 | A | A |
| EXAMPLE 9 | RESIN INK 1 | 200% | GLITTER INK 1 | 40% | PET2 | A | A |
| EXAMPLE 10 | RESIN INK 1 | 100% | GLITTER INK 1 | 40% | PET2 | A | A |
| EXAMPLE 11 | RESIN INK 2 | 500% | GLITTER INK 1 | 40% | PET2 | A | A |
| EXAMPLE 12 | RESIN INK 2 | 400% | GLITTER INK 1 | 40% | PET2 | A | A |
| EXAMPLE 13 | RESIN INK 2 | 300% | GLITTER INK 1 | 40% | PET2 | A | A |
| EXAMPLE 14 | RESIN INK 2 | 200% | GLITTER INK 1 | 40% | PET2 | A | A |
| EXAMPLE 15 | RESIN INK 2 | 100% | GLITTER INK 1 | 40% | PET2 | A | A |
| EXAMPLE 16 | RESIN INK 3 | 500% | GLITTER INK 1 | 40% | PET2 | A | A |
| EXAMPLE 17 | RESIN INK 3 | 400% | GLITTER INK 1 | 40% | PET2 | A | A |
| EXAMPLE 18 | RESIN INK 3 | 300% | GLITTER INK 1 | 40% | PET2 | A | A |
| EXAMPLE 19 | RESIN INK 3 | 200% | GLITTER INK 1 | 40% | PET2 | A | A |
| EXAMPLE 20 | RESIN INK 3 | 100% | GLITTER INK 1 | 40% | PET2 | A | A |
| EXAMPLE 21 | RESIN INK 1 | 500% | GLITTER INK 1 | 40% | SYNTHETIC PAPER (PP) | A | A |
| EXAMPLE 22 | RESIN INK 1 | 400% | GLITTER INK 1 | 40% | SYNTHETIC PAPER (PP) | A | A |
| EXAMPLE 23 | RESIN INK 1 | 300% | GLITTER INK 1 | 40% | SYNTHETIC PAPER (PP) | A | A |
| EXAMPLE 24 | RESIN INK 1 | 200% | GLITTER INK 1 | 40% | SYNTHETIC PAPER (PP) | B | A |
| EXAMPLE 25 | RESIN INK 1 | 100% | GLITTER INK 1 | 40% | SYNTHETIC PAPER (PP) | C | A |
| EXAMPLE 26 | RESIN INK 1 | 500% | GLITTER INK 1 | 40% | CAST PAPER | A | A |
| EXAMPLE 27 | RESIN INK 1 | 400% | GLITTER INK 1 | 40% | CAST PAPER | A | A |
| EXAMPLE 28 | RESIN INK 1 | 300% | GLITTER INK 1 | 40% | CAST PAPER | A | A |
| EXAMPLE 29 | RESIN INK 1 | 200% | GLITTER INK 1 | 40% | CAST PAPER | A | A |
| EXAMPLE 30 | RESIN INK 1 | 100% | GLITTER INK 1 | 40% | CAST PAPER | B | A |
| EXAMPLE 31 | RESIN INK 1 | 500% | GLITTER INK 1 | 40% | COAT PAPER | A | A |
| EXAMPLE 32 | RESIN INK 1 | 400% | GLITTER INK 1 | 40% | COAT PAPER | A | A |
| EXAMPLE 33 | RESIN INK 1 | 300% | GLITTER INK 1 | 40% | COAT PAPER | B | A |
| EXAMPLE 34 | RESIN INK 1 | 200% | GLITTER INK 1 | 40% | COAT PAPER | C | A |
| EXAMPLE 35 | RESIN INK 1 | 100% | GLITTER INK 1 | 40% | COAT PAPER | C | A |
| EXAMPLE 36 | RESIN INK 4 | — | GLITTER INK 1 | 40% | PET1 | S | A |
| EXAMPLE 37 | RESIN INK 4 | — | GLITTER INK 1 | 40% | PET2 | A | A |
| EXAMPLE 38 | RESIN INK 4 | — | GLITTER INK 1 | 40% | SYNTHETIC PAPER (PP) | A | A |
| EXAMPLE 39 | RESIN INK 4 | — | GLITTER INK 1 | 40% | CAST PAPER | S | A |
| EXAMPLE 40 | RESIN INK 4 | — | GLITTER INK 1 | 40% | COAT PAPER | A | A |
| COMPARATIVE EXAMPLE 1 | — | — | GLITTER INK 1 | 40% | PET1 | D | C |
| COMPARATIVE EXAMPLE 2 | — | — | GLITTER INK 1 | 40% | PET2 | D | C |
| COMPARATIVE EXAMPLE 3 | — | — | GLITTER INK 1 | 40% | SYNTHETIC PAPER (PP) | D | C |
| COMPARATIVE EXAMPLE 4 | — | — | GLITTER INK 1 | 40% | CAST PAPER | B | B |
| COMPARATIVE EXAMPLE 5 | — | — | GLITTER INK 1 | 40% | COAT PAPER | C | B |
| REFERENCE EXAMPLE 1 | — | — | GLITTER INK 1 | 40% | PHOTO PAPER | S | A |

TABLE 3

| | RESIN INK | | GLITTER INK | | RECORDING MEDIUM | EVALUATION | |
|---|---|---|---|---|---|---|---|
| | TYPE | duty | TYPE | duty | TYPE | GLOSSY EVALUATION | RESISTANCE TO FRICTION |
| EXAMPLE 41 | RESIN INK 1 | 500% | GLITTER INK 2 | 100% | PET2 | S | A |
| EXAMPLE 42 | RESIN INK 1 | 400% | GLITTER INK 2 | 100% | PET2 | S | A |
| EXAMPLE 43 | RESIN INK 1 | 300% | GLITTER INK 2 | 100% | PET2 | S | A |
| EXAMPLE 44 | RESIN INK 1 | 200% | GLITTER INK 2 | 100% | PET2 | A | A |
| EXAMPLE 45 | RESIN INK 1 | 100% | GLITTER INK 2 | 100% | PET2 | B | A |
| EXAMPLE 46 | RESIN INK 1 | 500% | GLITTER INK 2 | 100% | COAT PAPER | A | A |
| EXAMPLE 47 | RESIN INK 1 | 400% | GLITTER INK 2 | 100% | COAT PAPER | A | A |
| EXAMPLE 48 | RESIN INK 1 | 300% | GLITTER INK 2 | 100% | COAT PAPER | B | A |
| EXAMPLE 49 | RESIN INK 1 | 200% | GLITTER INK 2 | 100% | COAT PAPER | C | A |
| EXAMPLE 50 | RESIN INK 1 | 100% | GLITTER INK 2 | 100% | COAT PAPER | C | A |
| COMPARATIVE EXAMPLE 6 | — | — | GLITTER INK 2 | 100% | PET2 | D | C |
| COMPARATIVE EXAMPLE 7 | — | — | GLITTER INK 2 | 100% | COAT PAPER | D | B |
| REFERENCE EXAMPLE 2 | — | — | GLITTER INK 2 | 100% | PHOTO PAPER | S | A |

TABLE 4

| | RESIN INK | | GLITTER INK | | RECORDING MEDIUM | EVALUATION | |
|---|---|---|---|---|---|---|---|
| | TYPE | duty | TYPE | duty | TYPE | GLOSSY EVALUATION | RESISTANCE TO FRICTION |
| EXAMPLE 51 | RESIN INK 1 | 500% | GLITTER INK 1 | 40% | HIGH-QUALITY PAPER | A | O |
| EXAMPLE 52 | RESIN INK 1 | 400% | GLITTER INK 1 | 40% | HIGH-QUALITY PAPER | B | O |
| EXAMPLE 53 | RESIN INK 1 | 300% | GLITTER INK 1 | 40% | HIGH-QUALITY PAPER | C | O |
| EXAMPLE 54 | RESIN INK 1 | 200% | GLITTER INK 1 | 40% | HIGH-QUALITY PAPER | C | O |
| EXAMPLE 55 | RESIN INK 1 | 100% | GLITTER INK 1 | 40% | HIGH-QUALITY PAPER | D | O |
| EXAMPLE 56 | RESIN INK 1 | 500% | GLITTER INK 1 | 40% | PLAIN PAPER | A | O |
| EXAMPLE 57 | RESIN INK 1 | 400% | GLITTER INK 1 | 40% | PLAIN PAPER | A | O |
| EXAMPLE 58 | RESIN INK 1 | 300% | GLITTER INK 1 | 40% | PLAIN PAPER | B | O |
| EXAMPLE 59 | RESIN INK 1 | 200% | GLITTER INK 1 | 40% | PLAIN PAPER | B | O |
| EXAMPLE 60 | RESIN INK 1 | 100% | GLITTER INK 1 | 40% | PLAIN PAPER | C | O |
| EXAMPLE 61 | RESIN INK 2 | 500% | GLITTER INK 1 | 40% | HIGH-QUALITY PAPER | S | O |
| EXAMPLE 62 | RESIN INK 2 | 400% | GLITTER INK 1 | 40% | HIGH-QUALITY PAPER | A | O |
| EXAMPLE 63 | RESIN INK 2 | 300% | GLITTER INK 1 | 40% | HIGH-QUALITY PAPER | B | O |
| EXAMPLE 64 | RESIN INK 2 | 200% | GLITTER INK 1 | 40% | HIGH-QUALITY PAPER | C | O |
| EXAMPLE 65 | RESIN INK 2 | 100% | GLITTER INK 1 | 40% | HIGH-QUALITY PAPER | C | O |
| EXAMPLE 66 | RESIN INK 3 | 500% | GLITTER INK 1 | 40% | HIGH-QUALITY PAPER | S | O |
| EXAMPLE 67 | RESIN INK 3 | 400% | GLITTER INK 1 | 40% | HIGH-QUALITY PAPER | A | O |
| EXAMPLE 68 | RESIN INK 3 | 300% | GLITTER INK 1 | 40% | HIGH-QUALITY PAPER | B | O |
| EXAMPLE 69 | RESIN INK 3 | 200% | GLITTER INK 1 | 40% | HIGH-QUALITY PAPER | C | O |
| EXAMPLE 70 | RESIN INK 3 | 100% | GLITTER INK 1 | 40% | HIGH-QUALITY PAPER | D | O |
| EXAMPLE 71 | RESIN INK 4 | — | GLITTER INK 1 | 40% | HIGH-QUALITY PAPER | S | O |
| EXAMPLE 72 | RESIN INK 4 | — | GLITTER INK 1 | 40% | PLAIN PAPER | S | O |
| COMPARATIVE EXAMPLE 8 | — | — | GLITTER INK 1 | 40% | HIGH-QUALITY PAPER | D | — |
| REFERENCE EXAMPLE 3 | — | — | GLITTER INK 1 | 40% | PHOTO PAPER | S | — |

TABLE 5

| | RESIN INK | | GLITTER INK | | RECORDING MEDIUM | EVALUATION | |
|---|---|---|---|---|---|---|---|
| | TYPE | duty | TYPE | duty | TYPE | GLOSSY EVALUATION | RESISTANCE TO FRICTION |
| EXAMPLE 73 | RESIN INK 1 | 500% | GLITTER INK 2 | 100% | HIGH-QUALITY PAPER | A | O |
| EXAMPLE 74 | RESIN INK 1 | 400% | GLITTER INK 2 | 100% | HIGH-QUALITY PAPER | A | O |
| EXAMPLE 75 | RESIN INK 1 | 300% | GLITTER INK 2 | 100% | HIGH-QUALITY PAPER | B | O |
| EXAMPLE 76 | RESIN INK 1 | 200% | GLITTER INK 2 | 100% | HIGH-QUALITY PAPER | C | O |

TABLE 5-continued

| | RESIN INK | | GLITTER INK | | RECORDING MEDIUM | EVALUATION | |
| | | | | | | GLOSSY | RESISTANCE |
| | TYPE | duty | TYPE | duty | TYPE | EVALUATION | TO FRICTION |
|---|---|---|---|---|---|---|---|
| EXAMPLE 77 | RESIN INK 1 | 100% | GLITTER INK 2 | 100% | HIGH-QUALITY PAPER | C | O |
| COMPARATIVE EXAMPLE 9 | — | — | GLITTER INK 2 | 100% | HIGH-QUALITY PAPER | D | — |
| REFERENCE EXAMPLE 4 | — | — | GLITTER INK 2 | 100% | PHOTO PAPER | S | — |

TABLE 6

| | RESIN INK | | GLITTER INK | | RECORDING MEDIUM | EVALUATION | |
| | | | | | | GLOSSY | RESISTANCE |
| | TYPE | duty | TYPE | duty | TYPE | EVALUATION | TO FRICTION |
|---|---|---|---|---|---|---|---|
| EXAMPLE 78 | RESIN INK 1 | 500% | GLITTER INK 1 | 40% | HIGH-QUALITY PAPER | B | O |
| EXAMPLE 79 | RESIN INK 1 | 400% | GLITTER INK 1 | 40% | HIGH-QUALITY PAPER | B | O |
| EXAMPLE 80 | RESIN INK 1 | 300% | GLITTER INK 1 | 40% | HIGH-QUALITY PAPER | C | O |
| EXAMPLE 81 | RESIN INK 1 | 200% | GLITTER INK 1 | 40% | HIGH-QUALITY PAPER | D | O |
| EXAMPLE 82 | RESIN INK 1 | 100% | GLITTER INK 1 | 40% | HIGH-QUALITY PAPER | D | O |

4. Evaluation 4.1. Glossy

The glossy of each printing surface of the printed matter according to the examples, the comparative examples, and the reference examples was measured at the turning angle of 60° by using the glossmeter (MINOLTA MULTI GLOSS 268), and the glossy was evaluated by the following criteria. In addition, the criteria are based on numerical values (the reference examples) of the glossy when printing is performed on the photo papers (photo paper <gloss>, manufactured by Seiko Epson Corp.) of the reference examples 1 and 2.

1. Glitter Ink 1
S: glossy of 500 or more
A: glossy of 350 or more and less than 500
B: glossy of 200 or more and less than 350
C: glossy of 50 or more and less than 200
D: glossy of less than 50

2. Glitter Ink 2
S: glossy of 280 or more
A: glossy of 200 or more and less than 280
B: glossy of 120 or more and less than 200
C: glossy of 40 or more and less than 120
D: glossy of less than 40

4.2. Test of Resistance to Friction

The dried printed matter was set on a Gakushin-type abrasion tester AB-301 (trade name, manufactured by Tester Sangyo Co., Ltd.), and an abrading material (load; 300 g) of which the contact portion was provided with a white cotton cloth (according to JIS L 0803) was scrubbed 10 times, whereby resistance to abrasion was evaluated. In addition, a case where the resistance to friction was improved when the resin ink layer was not provided is represented by "O".

The results thereof are shown in Tables 2 to 6.

As can be clearly seen from Tables 2 to 6, in the printed matter, which was obtained by the ink jet printing method according to the embodiment of the invention, the glossy and resistance to friction were excellent. However, in the comparative examples, it was difficult to obtain a desirable result.

4.3. Foundation Layer (Resin Ink Layer) and Glitter Ink Layer

Figure 2:
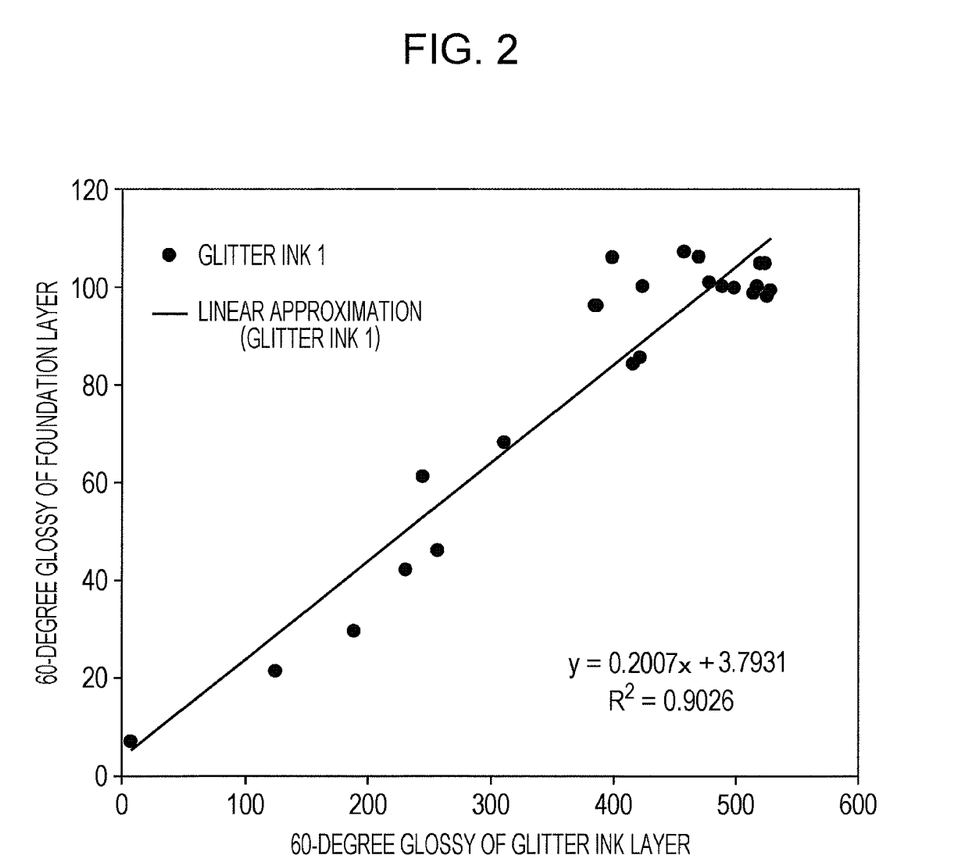
FIG. 2 is a graph illustrating a relationship between a 60-degree glossy of the foundation layer and a 60-degree glossy of a glitter ink layer.

FIG. 2 is a graph illustrating a relationship between the 60-degree glossy of the foundation layer and the 60-degree glossy of the glitter ink layer (glitter layer).

As can be clearly seen from FIG. 2, according to the ink jet printing method of the embodiment of the invention, it is possible to provide the foundation layer, which is excellent in absorbability and smoothness (glossy), to various printing media. Accordingly, it is possible to obtain a glitter layer with high glossy and high resistance to friction.

What is claimed is:

1. An ink jet printing method of printing aqueous glitter ink, in which glitter pigment is dispersed, onto a non-ink-absorption or low-ink-absorption printing medium or a printing medium of which an arithmetic average roughness Ra is 20 μm or more, the ink jet printing method comprising:
    forming a foundation layer by providing foundation ink, which includes a resin component, onto at least a portion of the printing medium on which the aqueous glitter ink is intended to be recorded;
    printing the aqueous glitter ink onto the foundation layer; and
    permeating water in the aqueous glitter ink into the foundation layer so that the glitter pigment is smoothly arranged on the foundation layer to control glossiness of the foundation layer such that a 60-degree glossy of the foundation layer is 90 or more;
    wherein the resin component is at least one material selected from the group of styrene-acrylic acid copolymer and polyurethane;
    the forming of the foundation layer includes drying the foundation layer at a drying temperature that is 30° C. or more and 120° C. or less; and
    an arithmetic average roughness Ra of the foundation layer is 20 μm or less.

2. An ink set comprising the glitter ink and the foundation ink used in the ink jet printing method according to claim 1.

3. A printed matter which is recorded in the ink jet printing method according to claim 1.

4. A printing apparatus which is used in the ink jet printing method according to claim 1.

5. An ink jet printing method of printing aqueous glitter ink, in which glitter pigment is dispersed, onto a non-ink-absorption or low-ink-absorption printing medium or a printing medium of which an arithmetic average roughness Ra is 20 μm or more, the ink jet printing method comprising:

forming a foundation layer by providing a foundation ink, which includes a resin component, onto at least a portion of the printing medium on which the aqueous glitter ink is intended to be recorded;

forming a glitter ink layer by printing the aqueous glitter ink onto the foundation layer;

permeating water in the aqueous glitter ink into the foundation layer so that the glitter pigment is smoothly arranged on the foundation layer to control glossiness of the foundation layer such that a 60-degree glossy of the foundation layer is 90 or more, wherein a thickness of the foundation layer is greater than a thickness of the glitter ink layer;

the thickness of the foundation layer is 1 μm or more and 15 μm or less;

the resin component is at least one material selected from the group of styrene-acrylic acid copolymer and polyurethane;

the forming of the foundation layer includes drying the foundation layer at a drying temperature that is 30° C. or more and 120° C. or less; and an arithmetic average roughness Ra of the foundation layer is 20 μm or less.

\* \* \* \* \*